US011269835B2

(12) United States Patent
Huang et al.

(10) Patent No.: US 11,269,835 B2
(45) Date of Patent: Mar. 8, 2022

(54) CUSTOMIZATION AND RECOMMENDATION OF TREE-STRUCTURED TEMPLATES

(71) Applicant: International Business Machines Corporation, Armonk, NY (US)

(72) Inventors: Lei Huang, Mountain View, CA (US); Guangjie Ren, Belmont, CA (US); Shun Jiang, San Jose, CA (US); Raphael I. Arar, Santa Cruz, CA (US); Eric Young Liu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 16/509,359

(22) Filed: Jul. 11, 2019

(65) Prior Publication Data

US 2021/0011896 A1 Jan. 14, 2021

(51) Int. Cl.
*G06F 16/00* (2019.01)
*G06F 16/22* (2019.01)
*G06F 16/25* (2019.01)
*G06F 16/28* (2019.01)

(52) U.S. Cl.
CPC ........ *G06F 16/2246* (2019.01); *G06F 16/258* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 7,660,804 B2 | 2/2010 | Wen et al. | |
| 7,849,115 B2 | 12/2010 | Reiner | |
| 8,060,857 B2* | 11/2011 | Biggerstaff | ............ G06F 8/456 |
| | | | 717/106 |
| 8,239,387 B2 | 8/2012 | Madaan et al. | |
| 9,563,689 B1 | 2/2017 | Pueyo et al. | |
| 9,922,022 B2* | 3/2018 | Masson | ................ G06F 16/951 |
| 2008/0046441 A1* | 2/2008 | Wen | ...................... G06F 40/143 |
| 2009/0216708 A1* | 8/2009 | Madaan | ................ G06F 16/355 |
| 2010/0199257 A1* | 8/2010 | Biggerstaff | ............ G06F 8/456 |
| | | | 717/104 |

(Continued)

FOREIGN PATENT DOCUMENTS

| | | |
|---|---|---|
| CN | 105426352 A | 3/2016 |
| WO | 2017136249 A1 | 8/2017 |

*Primary Examiner* — Farhan M Syed
(74) *Attorney, Agent, or Firm* — Zilka-Kotab, P.C.

(57) ABSTRACT

A computer-implemented method, according to one embodiment, is used to creating customized templates and template recommendations. The computer-implemented method includes: extracting text content from user information which corresponds to a user, and using the text content extracted from the user information to generate feature vectors. The feature vectors are further used to form one or more clusters of existing user editions. For each of the one or more formed clusters, a tree structure is generated for each user edition in the cluster. Moreover, the tree structures in the cluster are combined into a merged tree structure. A customized template is generated for each of the one or more formed clusters using the respective merged tree structure, and at least one of the customized templates is recommended to the user based on the user information.

20 Claims, 13 Drawing Sheets

(56) References Cited

U.S. PATENT DOCUMENTS

| | | | |
|---|---|---|---|
| 2014/0280161 A1* | 9/2014 | Riggs | G06F 16/9024 707/737 |
| 2015/0310089 A1* | 10/2015 | Riggs | G06Q 40/06 707/738 |
| 2016/0098475 A1* | 4/2016 | Riggs | G06F 16/282 707/738 |
| 2017/0220544 A1* | 8/2017 | Masson | G06F 40/186 |

* cited by examiner

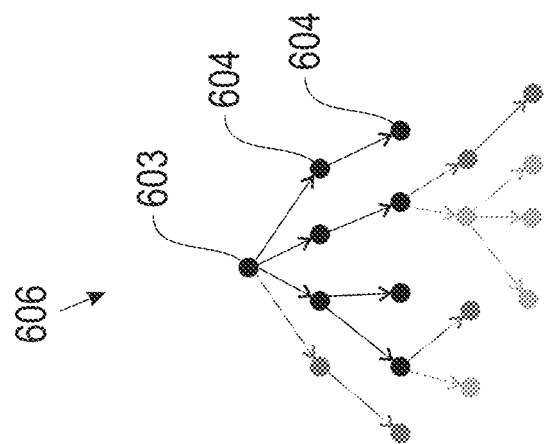
FIG. 6B
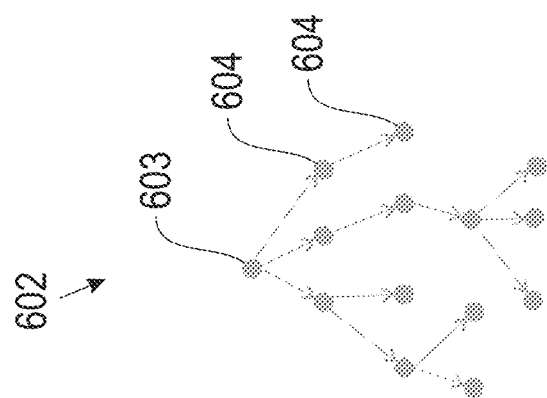
FIG. 6A
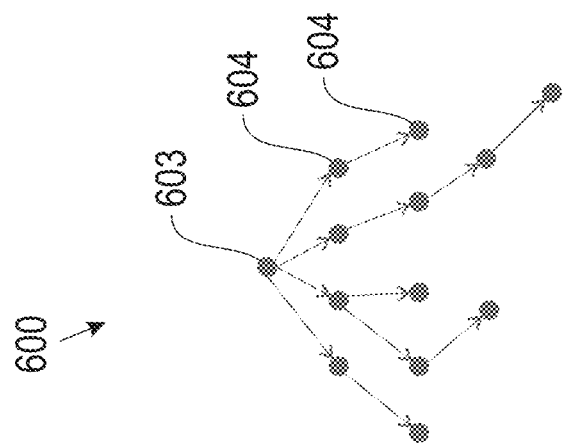

Pseudocode: Feature Extraction for Each Node
input: Combined Tree - T_combined
output: Feature Vectors set FV for Nodes
For each node V[i] in node set V of T_combined:
    FV[i] = build_feature_vec(V[i], V[i]_offsprings)
    // collect all the text information from node V[i] and its offsprings,
    and use doc2vec to generate the feature vector
return FV

FIG. 7B

Pseudocode: top-down clustering and merging by depth
input:   Combined Tree - T_combined
        Feature Vector - FV
output:   Customized Template Tree - T_customized For each depth i in T_combined:
    node_subset = all nodes at depth i
    C = clustering(node_subset, FV)
    For each cluster C[j]: //update T_Combined
        if C[j] is trivial/minor cluster:
            remove nodes in C[j] and their offspring from T_Combined
else:
            merge nodes in C[j] into one node with a most commonly used name
and put all their offspring under the new node as its offspring return the final
T_combined as T_custmoized

FIG. 7C

CUSTOMIZATION AND RECOMMENDATION OF TREE-STRUCTURED TEMPLATES

BACKGROUND

The present invention relates to the customization of templates, and more specifically, this invention relates to generating custom templates for users based on information associated with the users.

Templates are commonly used in different services related to word processing, web-based builders, business architecture modeling, etc. Templates serve as a valuable tool in terms of simplifying the generation of desired content. Templates effectively serve as the skeletons which help form the start of the desired content, thereby allowing for resources to desirably be spent elsewhere.

However, templates have traditionally been pre-designed by individuals who often lack insight in terms of what the template(s) will ultimately be used for, much less how. It follows that conventional templates are fixed and therefore unable to evolve as changes occur to a user's preferences.

SUMMARY

A computer-implemented method, according to one embodiment, is used to create customized templates and template recommendations. The computer-implemented method includes: extracting text content from user information which corresponds to a user, and using the text content extracted from the user information to generate feature vectors. The feature vectors are further used to form one or more clusters of existing user editions. For each of the one or more formed clusters, a tree structure is generated for each user edition in the cluster. Moreover, the tree structures in the cluster are combined into a merged tree structure. A customized template is generated for each of the one or more formed clusters using the respective merged tree structure, and at least one of the customized templates is recommended to the user based on the user information.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6A is a representational view of two tree structures, in accordance with one embodiment.

FIG. 6B is a representational view of a merged structure, in accordance with one embodiment.

FIGS. 7B-7C are representational views of pseudocode, in accordance with exemplary embodiments.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for generating custom templates and providing recommendations with respect to custom templates, e.g., as will be described in further detail below.

In one general embodiment, a computer-implemented method is used to create customized templates and template recommendations. The computer-implemented method includes: extracting text content from user information which corresponds to a user, and using the text content extracted from the user information to generate feature vectors. The feature vectors are further used to form one or more clusters of existing user editions. For each of the one or more formed clusters, a tree structure is generated for each user edition in the cluster. Moreover, the tree structures in the cluster are combined into a merged tree structure. A customized template is generated for each of the one or more formed clusters using the respective merged tree structure, and at least one of the customized templates is recommended to the user based on the user information.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method.

Figure 1:
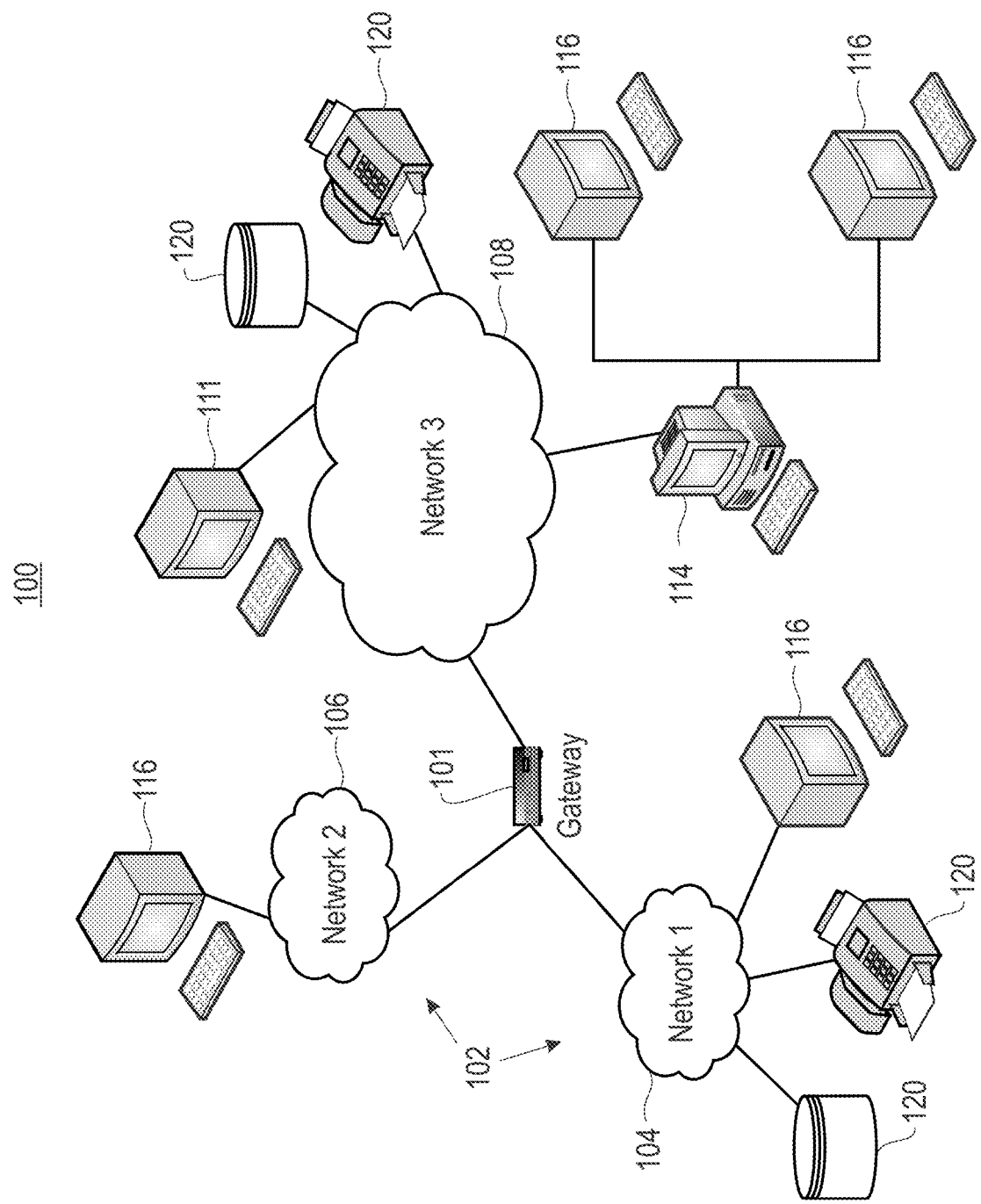
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
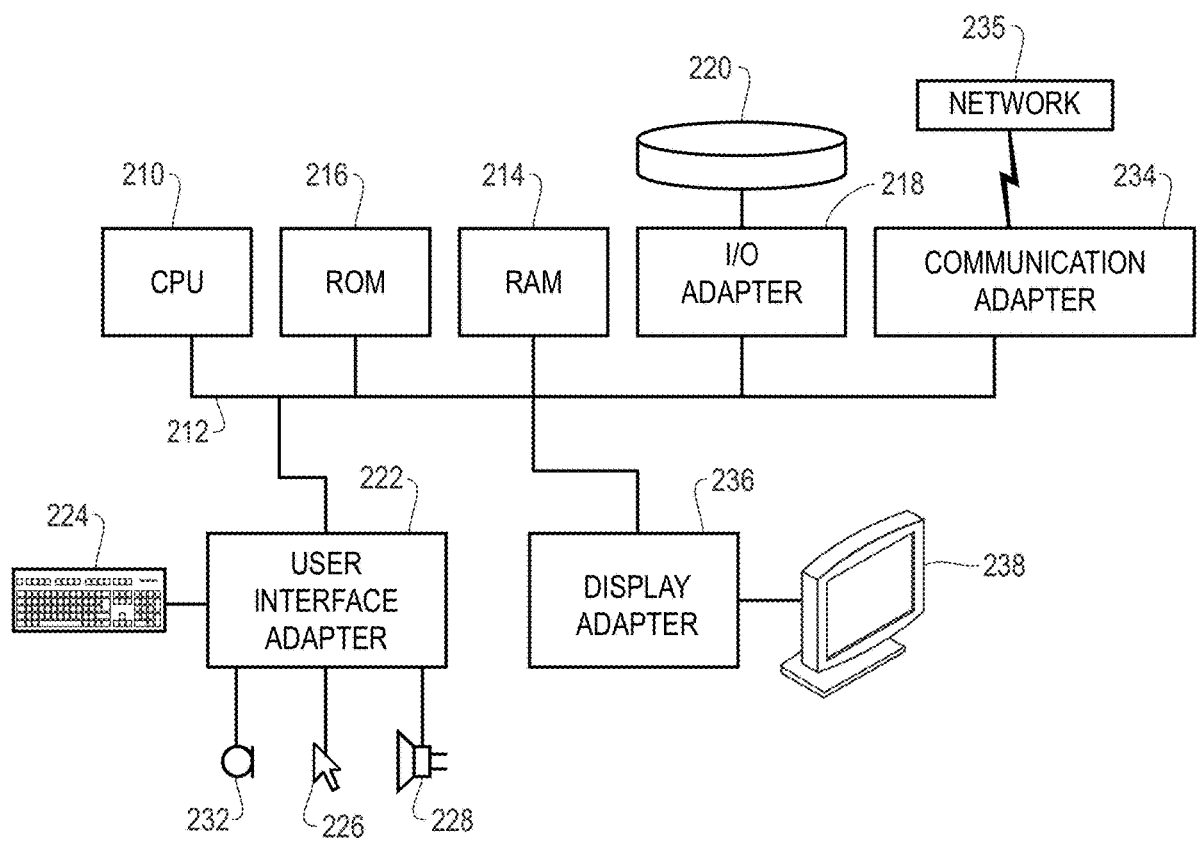
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
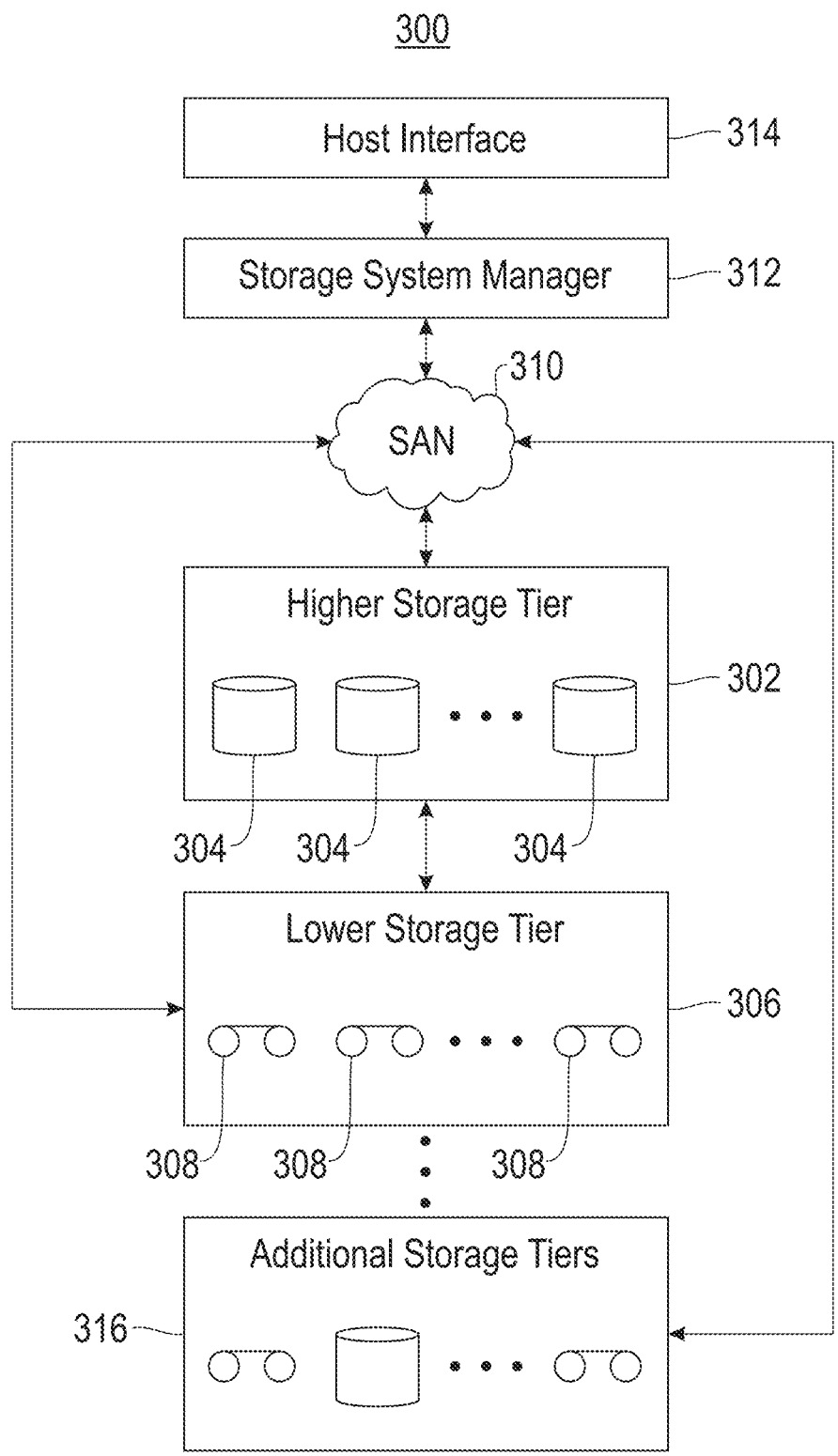
FIG. 3 is a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, templates have traditionally been pre-designed by individuals who often lack insight in terms of what the template(s) will ultimately be used for, much less how. It follows that conventional templates are fixed and therefore unable to evolve as changes occur to a user's preferences. As a result, templates have conventionally been limited in their applicability.

In sharp contrast, various ones of the embodiments included herein are able to generate custom templates which are able to efficiently assist users in completing their tasks. These custom templates are generated using information which corresponds to the users themselves and their preferences, thereby increasing in-use applicability and retention. Recommendations may also be made to specific users based on the templates that are generated and/or the information that is available. In some approaches, these improvements are achieved by generating combined tree structures which are used in the process of actually forming the custom templates, e.g., as will be described in further detail below.

Figure 4A:
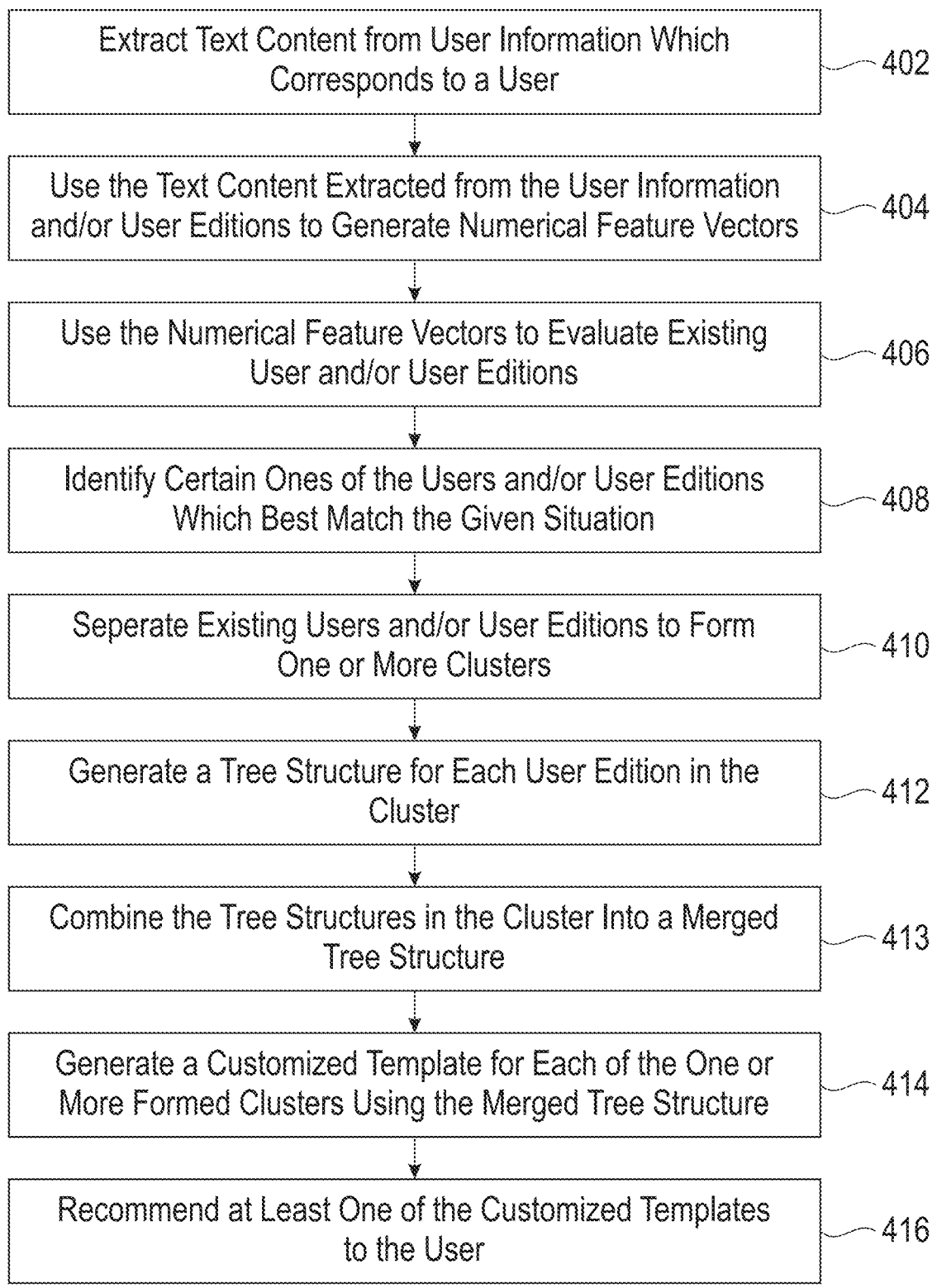
FIG. 4A is a flowchart of a method, in accordance with one embodiment.

Referring to FIG. 4A, a flowchart of a method 400 for creating customized templates and/or template recommendations is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, a computer, etc., or some other device having one or more processors therein. Thus, in some embodiments, method 400 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes extracting text content from user information which corresponds to a user. According to the present description, a "user" may include any person, company, entity, etc. which has a desire for a template. Accordingly, operation 402 may be performed in some approaches in response to receiving a request for a template from a user, or even an initial template (e.g., see FIG. 4B below). Moreover, the text content that is extracted from the user information that is available may also vary depending on the situation. For instance, in some approaches the text content that is extracted may depend on the type of user information that is available. An illustrative list of different user information types includes, but is in no way limited to, user background information, user expertise information, user preferences, desired features (e.g., template requirements), previous selections made by the user, etc.

The process of actually extracting the text content implements word recognition algorithms in some approaches. These algorithms may be provided with key words to search for as would be appreciated by one skilled in the art after reading the present description. These key words may be stored in memory, be updated dynamically based on the type of user, predetermined, etc. In some approaches, at least some text content may be extracted from user editions that are associated with the given user. With respect to the present description, a "user edition" is intended to refer to a previously issued custom (e.g., revised) template that was implemented by, recommended to, generated for, etc. the user. In other words, a template which has been adopted by a user adopted and had changes made thereto to generate a custom version is considered a user edition herein.

Method 400 also includes using the text content extracted from the user information and/or user editions to generate numerical feature vectors. See operation 404. In other words, operation 404 includes forming numerical values which represent the textual content that has been extracted. In some approaches, the extracted textual content may be considered as "keywords". Moreover, the process of generating the numerical feature vectors may include implementing a hash value to each portion of the text content. These hash values may further be stored in a hash table such that the corresponding text content is preserved. A density value which corresponds to the text content may also be assigned to some or all of the respective hash values. In some approaches, one of the entries in the hash map serves as a placeholder which stores a total weight of all keywords included in the hash map. For example, the last entry in the hash map is reserved for storing a total combined weight (or density) of all entries therein.

The numerical feature vectors are used to evaluate existing users and/or user editions. See operation 406. With respect to the present description, "existing users" are intended to refer to user profiles which correspond to repeat users. Thus, information corresponding to existing users may be stored in memory (e.g., in a lookup table) and used as desired. Moreover, as noted above "user editions" are intended to refer to previously issued custom templates as well as updates in terms of template structure, layout, content, etc., which have been made by the user. It follows that feature vectors and/or other information corresponding to previously formed user editions may be stored in memory and referenced in the process of developing a new custom template.

The evaluation performed in operation 406 is used to identify certain ones of the users and/or user editions which best match the given situation. See operation 408. In other words, the user information corresponding to the user is implemented in selecting previous users and/or user editions which resemble the current situation. According to some approaches which are in no way intended to limit the invention, users and/or user editions that have a predetermined number of similarities with the current user and/or a current template request are identified in operation 406. Moreover, any desired type of similarity analysis may be implemented in order to perform operation 408.

These existing users and/or user editions are further separated to form one or more clusters. See operation 410. The clusters of two or more existing user editions are preferably formed using the feature vectors. For instance, in some approaches the process of forming the one or more clusters of existing user editions includes extracting text content from the existing user editions, and using the text content extracted from the user editions along with the text content extracted from the user information to generate the feature vectors. The feature vectors are further used to combine two or more of the existing user editions into a cluster.

It follows that the feature vectors are used to form one or more clusters of existing user editions. Each cluster includes a number of user profiles and/or user editions which are determined as being sufficiently similar to each other. For example, Equation 1 as described below may be used to determine the similarity that exists between two or more specific nodes. Two or more user profiles and/or user editions determined as having a predetermined number of the same feature vectors may thereby be placed in a same cluster. These clusters are thereby preferably created using the numerical feature vectors formed in operation 404. In other words, the clusters are formed based on (e.g., using) the feature vectors directly. Depending on the approach, the user profiles and/or user editions may be identified as being included in a specific cluster by using flags, data headers and/or footers, a lookup table, etc.

Referring still to method 400, operation 412 includes generating a tree structure for each user edition in the cluster. In other words, a tree structure is formed for each of the clusters using the user profiles and/or user editions included in the given cluster. Each tree structure includes a plurality of nodes organized in a number of levels (e.g., depths). Moreover, each of the nodes in a tree structure serve as a component in the respective user edition. The tree structures are preferably organized such that each node in a same level represents a different aspect of a user profile and/or user edition.

Figure 5:
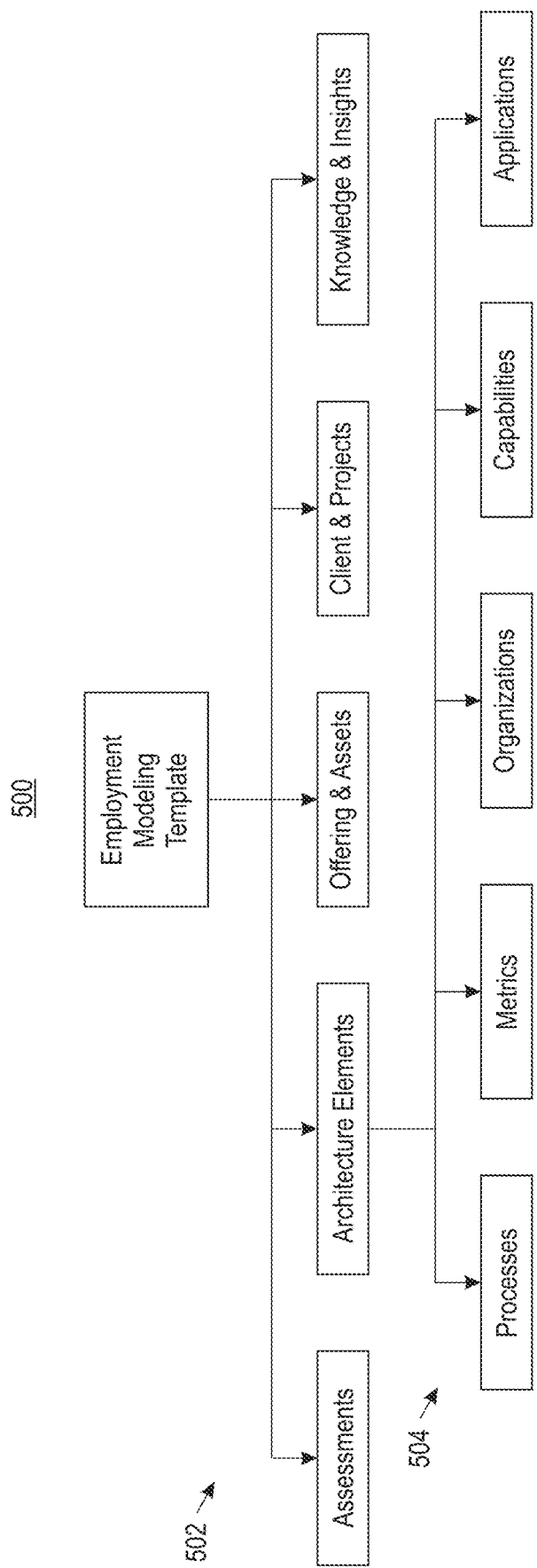
FIG. 5 is a partial representational view of a tree structure, in accordance with one embodiment.

User editions are derived from templates, and they include updates made by users. For added clarity, an analogy may be made in which the user edition is represented by a table, in which a component corresponds to a cell in the table. The component can also include sub components, e.g., such as a title, description, etc., and other text content. It follows that the table has a hierarchical structure (or "tree structure"), e.g., as seen in FIG. 5. Each user edition may thereby be represented by a tree structure, in which each node corresponds to a component, and the sub nodes extending therefrom indicate a sub component under that given node. A user edition cluster contains many similar user editions, each of which can be represented as a tree structure. Multiple tree structures in a given cluster may be merged into one combined tree.

It should also be noted that in preferred approaches, a user profile is not a part of a tree structure. Rather, a user profile is used to help accurately cluster different user editions, as well as predict and/or recommend templates for new users. For example, the profile (e.g., background, expertise, requirements, etc.) of a new user may be similar to users in a given cluster. As a result, the new user would likely be recommended a template generated using the given cluster.

Referring momentarily to FIG. 5, an exemplary tree structure 500 is illustrated in accordance with an in-use example, which is in no way intended to limit the invention. As shown, each node in a first level 502 corresponds to a different employment components. Moreover, each of the sub-nodes which extend from a given node in the first level 502 preferably correspond to the same or similar topic. For instance, looking to the "architecture elements" node in the first level 502, each sub-node which extends therefrom into the second level 504 is related to the topic of architecture elements.

Returning to method 400, the tree structure may be formed using any procedures which would be apparent to one skilled in the art after reading the present description. For instance, in some approaches each of the user profiles and/or user editions may be reformatted into a tree structure. Each of the tree structures that are formed may further be combined to form a single combined tree structure, e.g., as will soon become apparent.

Proceeding to operation 413, there method 400 includes combining the tree structures in the cluster into a merged tree structure. Furthermore, operation 414 includes generating a customized template for each of the one or more formed clusters using the respective merged tree structure. In preferred approaches, a top-down tree node clustering and merging method is implemented in order to generate the merged tree structure and/or the customized template for a given clusters using the respective merged tree structure. Looking momentarily to FIG. 4C, exemplary sub-processes of combining the tree structures in a cluster into a merged tree structure are illustrated in accordance with one embodiment, one or more of which may be used to perform operation 414 of FIG. 4A and/or operation 466 of FIG. 4B below. However, it should be noted that the sub-processes of FIG. 4C are illustrated in accordance with one embodiment which is in no way intended to limit the invention.

Figure 4B:
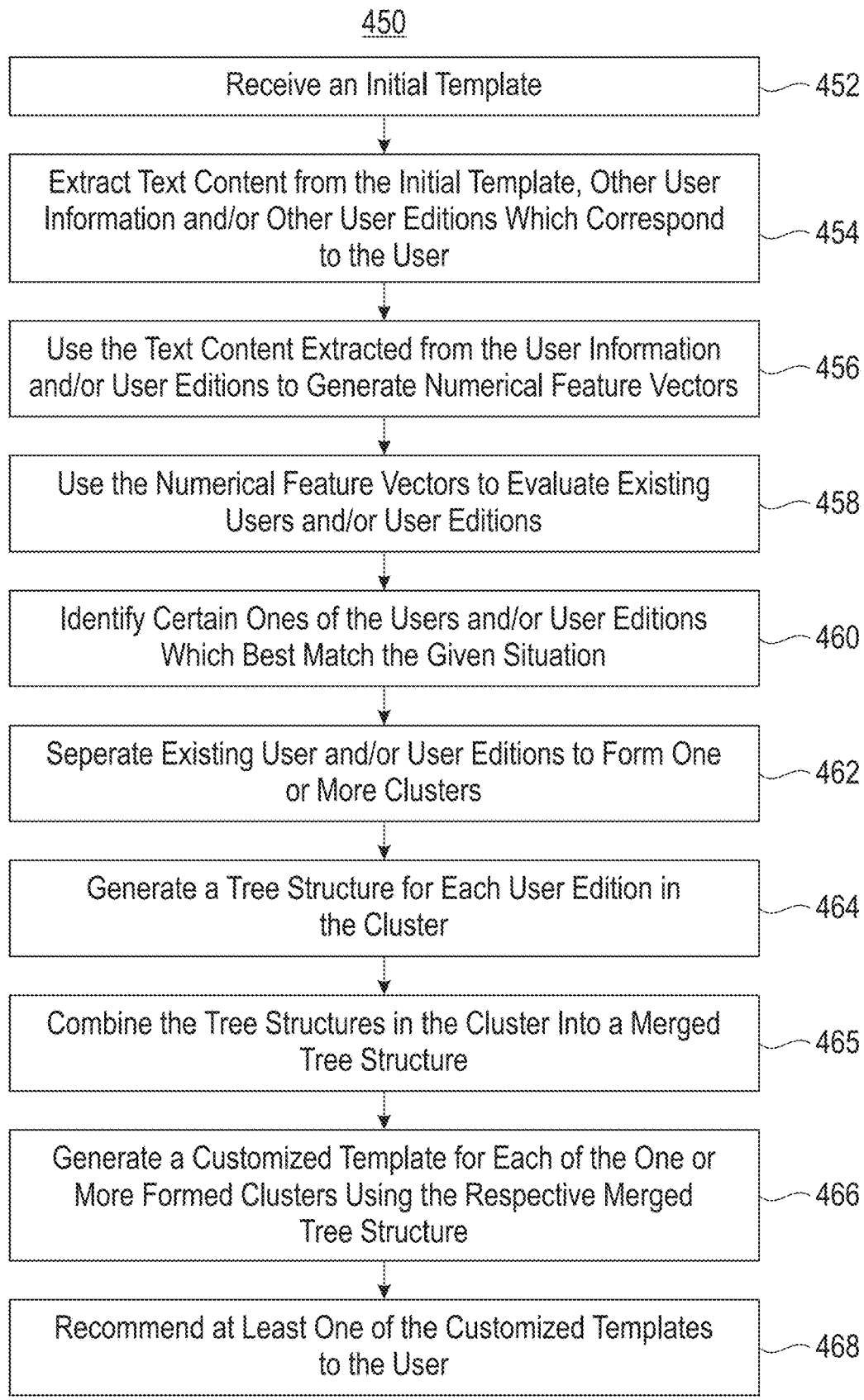
FIG. 4B is a flowchart of a method, in accordance with one embodiment.
Figure 4C:
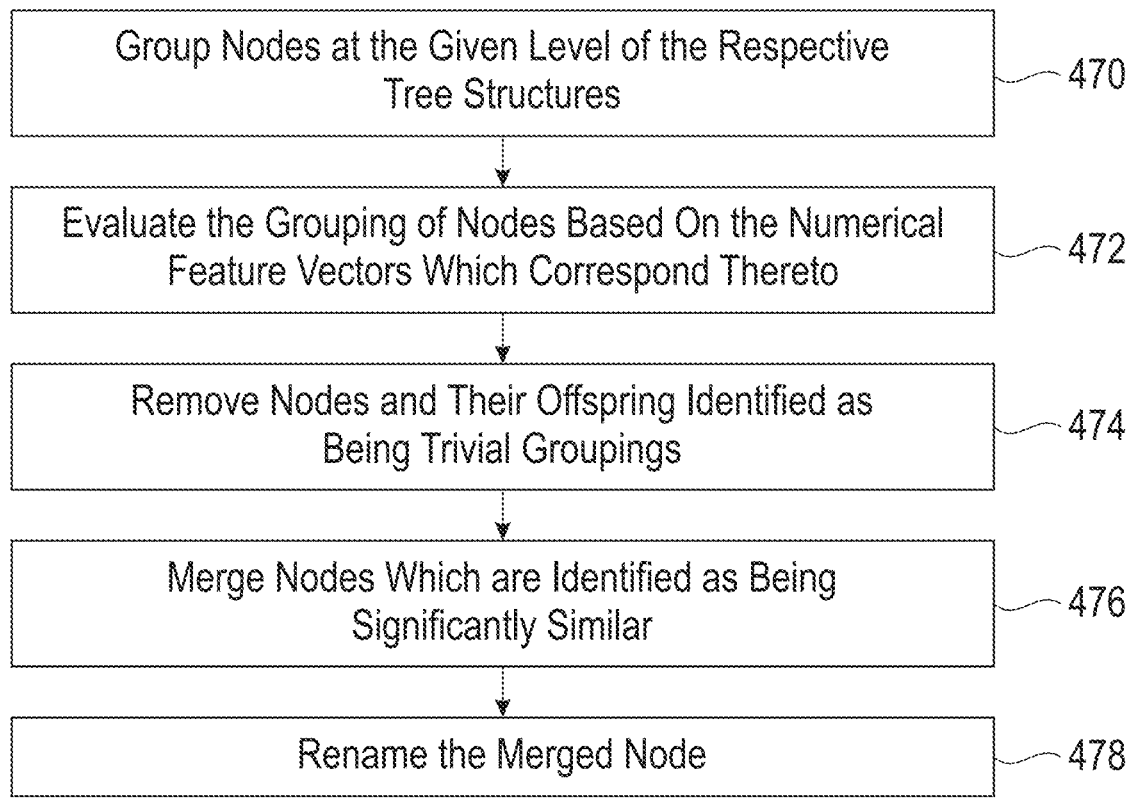
FIG. 4C is a flowchart of sub-processes for an operation, in accordance with one embodiment.

As shown, the sub-processes included in FIG. 4C are used to merge multiple user edition tree structures (preferably in the same cluster) into a combined tree structure by forming each level of the respective tree structure. It is preferred that the levels of the tree structures are formed (e.g., merged) in a top-down order in the interest of efficiency. For instance, the process of merging two or more nodes may also cause each of the sub-nodes which depend therefrom to be merged as well. However, tree structures may be merged according to any desired order, progression, procedures, etc.

Depending on the approach, any number of nodes may be included in a given tree structure, e.g., depending on the number, type, spread, etc., of user profiles and/or user editions used to form them. Accordingly, sub-operation 470 includes grouping nodes at the given level of the tree structures, while sub-operation 472 includes evaluating the grouping of nodes based on the numerical feature vectors which correspond thereto. In other words, sub-operation 472 includes determining whether there are any similarities and/or differences between the numerical feature vectors which correspond to each of the nodes that have been grouped together in sub-operation 470.

Depending on the approach, any desired type of procedure may be used to perform the evaluation in sub-operation 472. For example, in some approaches the feature vectors associated with two of the nodes may be compared with each other to determine whether the nodes are sufficiently similar to each other. This determination may be based on a number of similarities between the content of the feature vectors, how many feature vectors are associated with each of the nodes, predetermined criteria, etc., or any other factors which would be apparent to one skilled in the art after reading the present description.

Sub-operation 474 further includes removing nodes and their offspring identified as being trivial groupings. In other words, sub-operation 474 includes removing those nodes which have been identified as not being sufficiently similar to the other nodes in the same level of the tree structure. Moreover, the nodes which extend (e.g., "branch") from a node that is removed are also deleted from the tree structure in sub-operation 474, thereby avoiding any hanging branches in the tree structure.

While certain nodes may be identified as being "trivial" with respect to the other nodes in the same level of the tree structure, other nodes may be identified as providing important content to the given level and/or the tree structure as a whole. Accordingly, nodes which are identified as being significantly similar are merged together, thereby forming a merged node. See sub-operation 476. The process of merging two or more nodes determined as being sufficiently similar to each other may be performed in any desired manner. For instance, in some approaches the nodes may simply be combined by merging the feature vectors associated with each of the nodes. In other approaches, the process of merging two or more nodes may depend on whether any of the nodes have sub-nodes which extend therefrom. For instance, sub-nodes in branches which extend from two or more nodes that are being merged may simply be updated to extend from the same merged node. However, some situations the number, style, orientation, etc. of sub-nodes extending from a given node may actually play a role in determining whether the node is able to be merged with one or more other nodes.

Looking to FIGS. 6A-6B, a representational view of merging two different tree structures is illustrated in accordance with an in-use example which is in no way intended to limit the invention. As shown, FIG. 6A includes a first tree structure 600 as well as a second tree structure 602, each of which have a root 603 and a number of nodes 604 extending therefrom. The nodes 604 are further organized in levels, each of which corresponds to a different aspect of a user profile and/or user edition.

Moving to FIG. 6B, the merged tree structure 606 is formed by removing or merging the various nodes 604 included in the first and second tree structures 600, 602. Nodes which are common between the first and second tree structures 600, 602 may be merged in comparison to nodes which only appear in one of the tree structures. Accordingly, the resulting merged tree structure 606 may include a different number of nodes than the first and second tree structures 600, 602.

The process of merging nodes in different tree structures may be performed differently depending on the desired approach. For instance, in some approaches two tree structures may be merged by implementing any portion of the pseudocode included in the exemplary FIGS. 7B-7C. According to another illustrative approach, which is in no way intended to limit the invention, Equation 1 may be used to determine the how similar two or more nodes are. In other words, Equation 1 is used to illustrate the overall goal of template customization, which minimizes the dissimilarity between the cluster of user editions and the corresponding customized template for that cluster. Thus, a template which accurately corresponds to a cluster should implement features of user editions in that cluster as much and as accurately as possible.

$$min_f \sum_{j=1}^{n} dist(U_{i,j}, T_i) + \lambda U_{i,j}; dist = \text{edit distance} \quad \text{Equation 1}$$

Here, Equation 1 may involve generating a template "Ti" for a user edition cluster "Ui" by converting each user edition "Uij" in the user edition cluster "Ui" into a tree structure. Each of the tree structures are then merged together to form a single merged tree structure which is optimized and ultimately converted into a custom template "Ti". Thereby, Equation 1 can be used to measure the overall distance between user editions in the cluster "Ui" and the corresponding template "Ti", where "i" indicates number of clusters, "j" indicates the number of user edition in the cluster "Ui", and "Ti" is the template for cluster "Ui". Furthermore, "dist" indicates any distance calculating method, "min" represents minimization, and "λ" is a regularization parameter, e.g., as would be appreciated by one skilled in the art after reading the present description.

It follows that for each level in the tree structure "i", grouping nodes in the given level "i" is performed based on the nodes themselves and information that is available for the sub-nodes which extend therefrom. Text information may also be extracted from the nodes and/or their respective offspring. A feature vector is formed for each node, and the similarity between the nodes is measured based on feature vectors which correspond thereto.

Referring still to FIG. 4C, sub-operation 478 includes renaming the merged node. It should be noted that the process of renaming a merged node may actually involve changing the name (e.g., filename) associated with the merged node in some approaches. However, in other approaches the merged node may be "renamed" by changing the physical storage location, logical storage location, associated information in a lookup table, etc. depending on the desired approach. Moreover, the process of renaming the merged node may be based on any available information, e.g., such as a relative popularity associated with the merged node and/or the various portions thereof. For example, repeat feature vectors may be given more weight than feature vectors with a single occurrence.

Returning now to FIG. 4A, method 400 proceeds to operation 416 from operation 414. There, operation 416 includes recommending at least one of the customized templates to the user. It should be noted that the recommendation made in operation 416 is preferably based on the matching between user profile data and the customized templates. That is to say, the prediction is made based on which template best matches the relevant user profile (which includes information corresponding to background, expertise, requirements, etc.), and the recommendation is made accordingly. According to an exemplary approach, which is in no way intended to limit the invention, recommending at least one of the customized templates to the user based on the user information includes converting customized templates and user information into feature vectors, measuring a similarity based on the feature vectors, identifying a customized template which most closely matches the user information, and recommending the identified customized template.

Therefore, the user information available is preferably used to select one or more of the customized templates that determined as being a best fit for the given situation. However, the number, type, style, etc. of customized templates that are recommended to the user may depend on a number of other factors. The type of template at play may have an effect on the recommendation process. For instance, a word processing based template may have a number of different options in terms of formatting, text styles, margin sizes, colors, etc., which may affect the number and/or type of custom templates that are recommended. However, a presentation based template may only have a number of different background choices to choose from, thereby resulting in a fewer number and or type of custom templates that are recommended.

According to an exemplary embodiment, which is in no way intended to limit the invention, the process of recommending at least one of the customized templates to the user based at least in part on the user information includes comparing the customized templates with the numerical feature vectors. According to one approach, the comparison may be performed by attempting to match each available feature vector gleaned from the user with one or more nodes in a given customized template. In other words, the comparison may be made between the numerical feature vectors and the nodes themselves in each customized template. This comparison allows for one or more customized templates which most closely match the numerical feature vectors to be identified and recommended to the user accordingly.

Figure 7A:
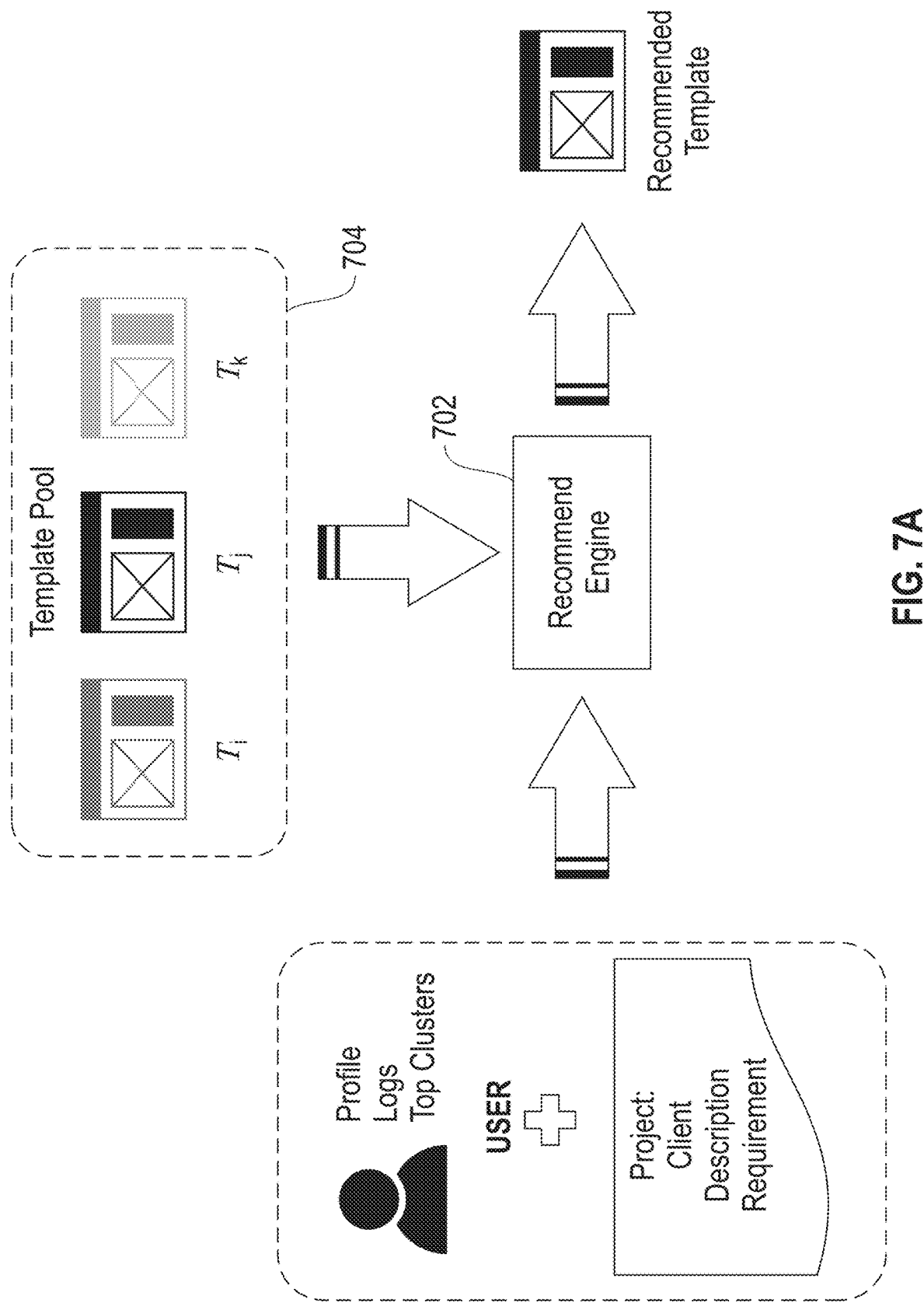
FIG. 7A is a representational view of a recommendation engine, in accordance with one embodiment.

According to another exemplary embodiment, which is in no way intended to limit the invention, the process of recommending at least one of the customized templates to the user may be performed by a recommendation engine, e.g., as shown in FIG. 7A. Referring momentarily to FIG. 7A, the recommendation engine 702 receives a user profile and information corresponding thereto, e.g., such as desired template features (e.g., user requirements). The recommendation engine 702 also has access to a number of different existing templates that are stored in a pool 704. Accordingly, the recommendation engine 702 is able to use the information received form the initial template as well as user information and/or user editions to modify the existing templates to form any desired number of user edition clusters and/or custom templates that may then be specifically recommended to a user.

As previously mentioned, in some approaches a request for a template, or even an initial template, is received. For approaches in which an initial template is received, a user may modify the initial template to create their own version(s) thereof, which are again referred to herein as user editions. Based on these user editions, various ones of the processes included herein are able to generate customized templates in turn (e.g., see method 450 above). However, for approaches in which an initial template is not provided, the processes included herein are able to learn and generate customized templates for individual users using their previous user editions and/or other similar editions made by other similar users (e.g., see method 400 above).

Accordingly, the process of generating a custom template may be based on one or more initial parameters that have been specified by the requesting user. Looking to FIG. 4B, a method 450 for creating customized templates and/or template recommendations based on an initial template is shown according to one embodiment. However, it should be noted that various ones of the approaches described in conjunction with the processes included in method 450 are similar and/or the same as those described above with respect to method 400. Accordingly, any one of the approaches described above may be implemented in method 450 as desired.

Each of the steps of the method 450 may be performed by any suitable component of the operating environment. For example, in various embodiments, the method 450 may be partially or entirely performed by a controller, a processor, a computer, etc., or some other device having one or more processors therein. Thus, in some embodiments, method 450 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 450. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4B, operation 452 of method 450 includes receiving an initial template. The initial template may be received from a user looking to develop a custom template for a specific situation in some approaches. Moreover, this initial template may be a previous template implemented by the user, a stock template that best fits the task facing the user, a template that has been developed by the user themselves, etc.

Operation 454 further includes extracting text content from the initial template, other user information, and/or other user editions which corresponds to the user. Any one or more of the approaches described above with respect to method 400 may be implemented in extracting the text content in operation 454, e.g., as would be appreciated by one skilled in the art.

Method 450 also includes using the text content extracted from the initial template, other user information, and/or other user editions to generate numerical feature vectors. See operation 456. In other words, operation 456 includes forming numerical values which represent the textual content that has been extracted. In some approaches, the extracted textual content may be considered as "keywords". Moreover, the process of generating the numerical feature vectors may use any of the approaches described above.

The numerical feature vectors are further used to evaluate existing users and/or user editions. See operation 458. The evaluation performed in operation 458 is used to identify certain ones of the users and/or user editions which best match the given situation. See operation 460. In other words, the user information corresponding to the initial template, other user information, and/or other user editions is implemented in selecting previous users and/or user editions which resemble the current situation. According to some approaches which are in no way intended to limit the invention, users and/or user editions that have a predetermined number of similarities with the current user and/or the current template are identified in operation 458. In other approaches, a number of user editions which are included in a given cluster and which correspond to a certain user may be used to determine whether a correlation exists with the given situation. Moreover, any desired type of similarity analysis may be implemented in order to perform operation 460.

These existing users and/or user editions are further separated to form one or more clusters. See operation 462. Each cluster includes a number of user profiles and/or user editions which are determined as being sufficiently similar to each other. For example, two or more user profiles and/or user editions determined as having a predetermined number of the same feature vectors may be placed in a same cluster. These clusters are thereby preferably created using the numerical feature vectors formed in operation 456. Depending on the approach, the user profiles and/or user editions may be identified as being included in a specific cluster by using flags, data headers and/or footers, a lookup table, etc.

Referring still to method 450, operation 464 includes generating a tree structure for each user edition in the cluster. In other words, a tree structure is formed for each of the clusters using the user profiles and/or user editions included in the given cluster. As noted above, each tree structure includes a plurality of nodes organized in a number of levels (e.g., depths). Moreover, each of the nodes in a tree structure serve as a component in the respective user edition. The tree structures are preferably organized such that each node in a same level represents a different aspect of a user profile and/or user edition, e.g., as illustrated in FIG. 5.

The tree structure may be formed using any procedures which would be apparent to one skilled in the art after reading the present description. For instance, in some approaches each of the user profiles and/or user editions may be reformatted into a tree structure. Each of the tree structures that are formed may further be combined to form a single combined tree structure, e.g., as will soon become apparent.

Proceeding to operation 465, there method 450 includes combining the tree structures in the cluster into a merged tree structure. Furthermore, operation 466 includes generating a customized template for each of the one or more formed clusters using the respective merged tree structure. In preferred approaches, a top-down tree node clustering and merging method is implemented in order to generate the merged tree structure and/or the customized template for a given clusters using the respective merged tree structure. In some approaches the customized templates are formed for each of the one or more formed clusters by modifying the template initially received in operation 452. In other words, the initial template is preferably modified differently for each of the one or more formed clusters, thereby forming a different custom template for each of the formed clusters. However, any one or more of the sub-processes included in FIG. 4C may be used to generate a customized template for a given cluster using the respective tree structure. Accordingly, any one or more of the sub-processes in FIG. 4C may be used to perform operation 466 of FIG. 4B and/or operation 414 of FIG. 4A above. However, it should be noted that the sub-processes of FIG. 4C are illustrated in accordance with one embodiment which is in no way intended to limit the invention.

With continued reference to FIG. 4B, method 450 proceeds to operation 468 from operation 466. There, operation 468 includes recommending at least one of the customized templates to the user. As noted above, the recommendation made in operation 468 is preferably based, at least in part, on the user information which corresponds to the given user. In other words, the user information available is preferably used to select one or more of the customized templates that determined as being a best fit for the given situation. However, the number, type, style, etc. of customized templates that are recommended to the user may depend on a number of other factors. The type of template at play may have an effect on the recommendation process. For instance, a word processing based template may have a number of different options in terms of formatting, text styles, margin sizes, colors, etc., which may affect the number and/or type of custom templates that are recommended. However, a presentation based template may only have a number of different background choices to choose from, thereby resulting in a fewer number and or type of custom templates that are recommended.

Looking now to FIGS. 7B-7C, pseudocode is provided for performing top-down grouping and merging of nodes in different tree structures in accordance with an exemplary embodiment which is in no way intended to limit the invention. The pseudocode may thereby be used in the process of generating a customized template for each of the one or more formed clusters using the respective tree structure.

The main process performed by the pseudocode in FIG. 7B involves building feature vectors for each node at a given level of the tree structures being combined. Moreover, this process is based on the information included in each respective grouping of nodes from the same level, as well as the information which corresponds to the sub-nodes which extend therefrom. It follows that the output provided includes feature vectors for the various nodes.

Moreover, the pseudocode included in FIG. 7C is primarily used to actually form the resulting, merged tree structure. This is achieved by again analyzing the nodes in a given level of the tree structures being combined. The feature vectors formed for these nodes (e.g., using the pseudocode in FIG. 7B) are used to combine certain ones of the nodes and determine whether certain ones should be removed or merged together. Newly formed merged nodes are thereafter renamed, e.g., according to any of the approaches included herein. Once formed, the resulting merged tree structure may be used to form (e.g., translated into) a customized template, available for use as desired.

It follows that various ones of the embodiments included herein are able to transform inputs (e.g., templates, user editions, user profiles, user preferences, etc.,) into outputs in the form of customized templates and/or template recommendations. This significantly improves the accuracy with which custom templates may be developed, thereby also increasing the applicability of these custom templates in a number of different situations.

Moreover, these improvements may be achieved with minimal cost as additional equipment and/or infrastructure is not used in many cases. Accordingly, various ones of the embodiments included herein may be implemented in a cloud-based computing environment. Accordingly, one skilled in the art will appreciated after reading the present description that any one or more of the approaches included herein can be implemented in a cloud computing environment. Furthermore, the various approaches herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
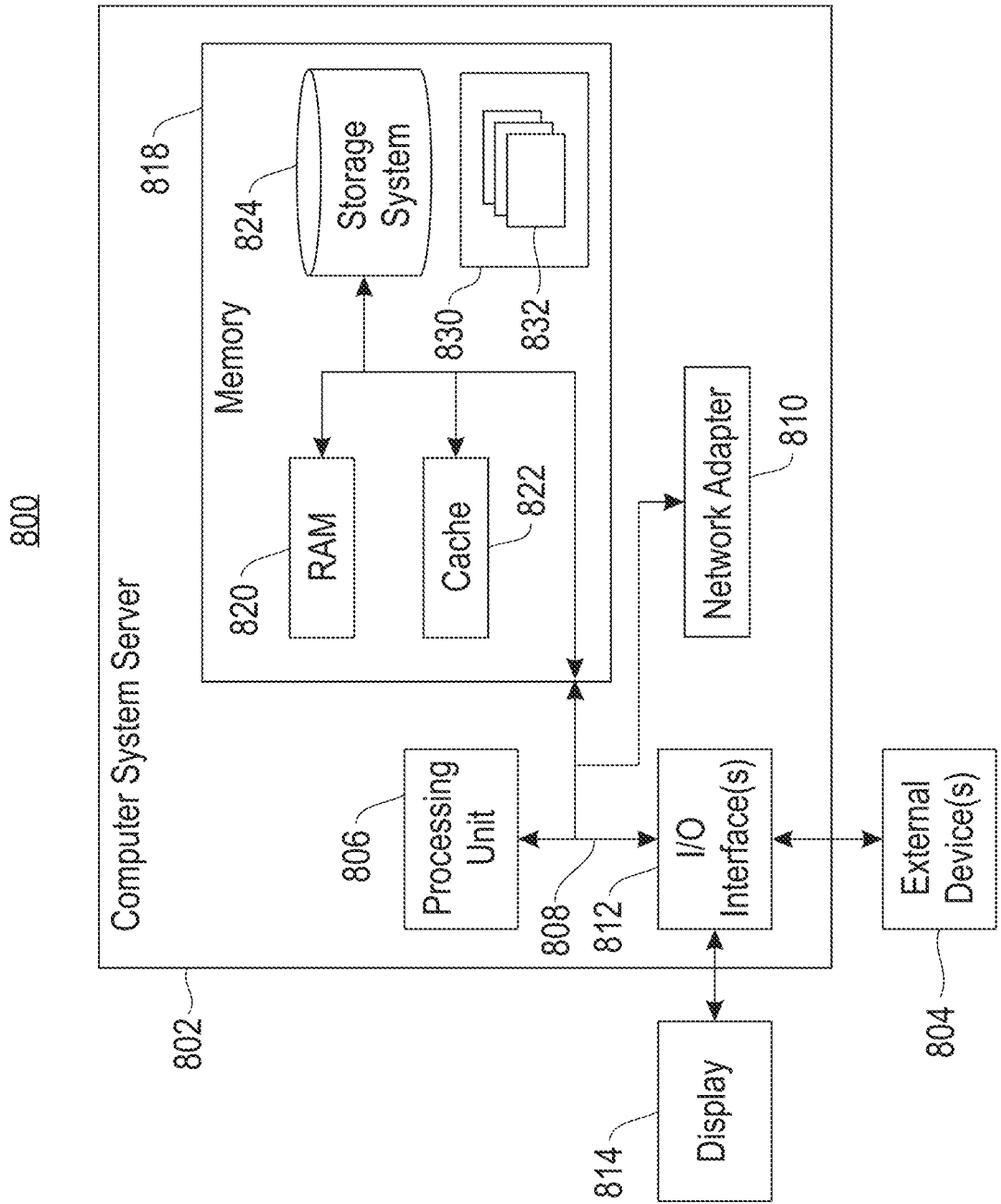
FIG. 8 depicts a cloud computing node, in accordance with one embodiment.

Referring now to FIG. 8, a schematic of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 806, a system memory 818, and a bus 808 that couples various system components including system memory 818 to processor 806.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 818 can include computer system readable media in the form of volatile memory, such as random access memory (RAM) 820 and/or cache memory 822. Computer system/server 802 may further include other removable/non-removable, volatile/non-volatile computer system storage media. By way of example only, storage system 824 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 818 may include at least one program product having a set (e.g., at least one) of program modules that are configured to carry out the functions of embodiments of the invention.

Program/utility 830, having a set (at least one) of program modules 832, may be stored in memory 818 by way of example, and not limitation, as well as an operating system, one or more application programs, other program modules, and program data. Each of the operating system, one or more application programs, other program modules, and program data or some combination thereof, may include an implementation of a networking environment. Program modules 832 generally carry out the functions and/or methodologies of embodiments of the invention as described herein.

Computer system/server 802 may also communicate with one or more external devices 804 such as a keyboard, a pointing device, a display 814, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 812. Still yet, computer system/server 802 can communicate with one or more networks such as a local area network (LAN), a general wide area network (WAN), and/or a public network (e.g., the Internet) via network adapter 810. As depicted, network adapter 810 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Figure 9:
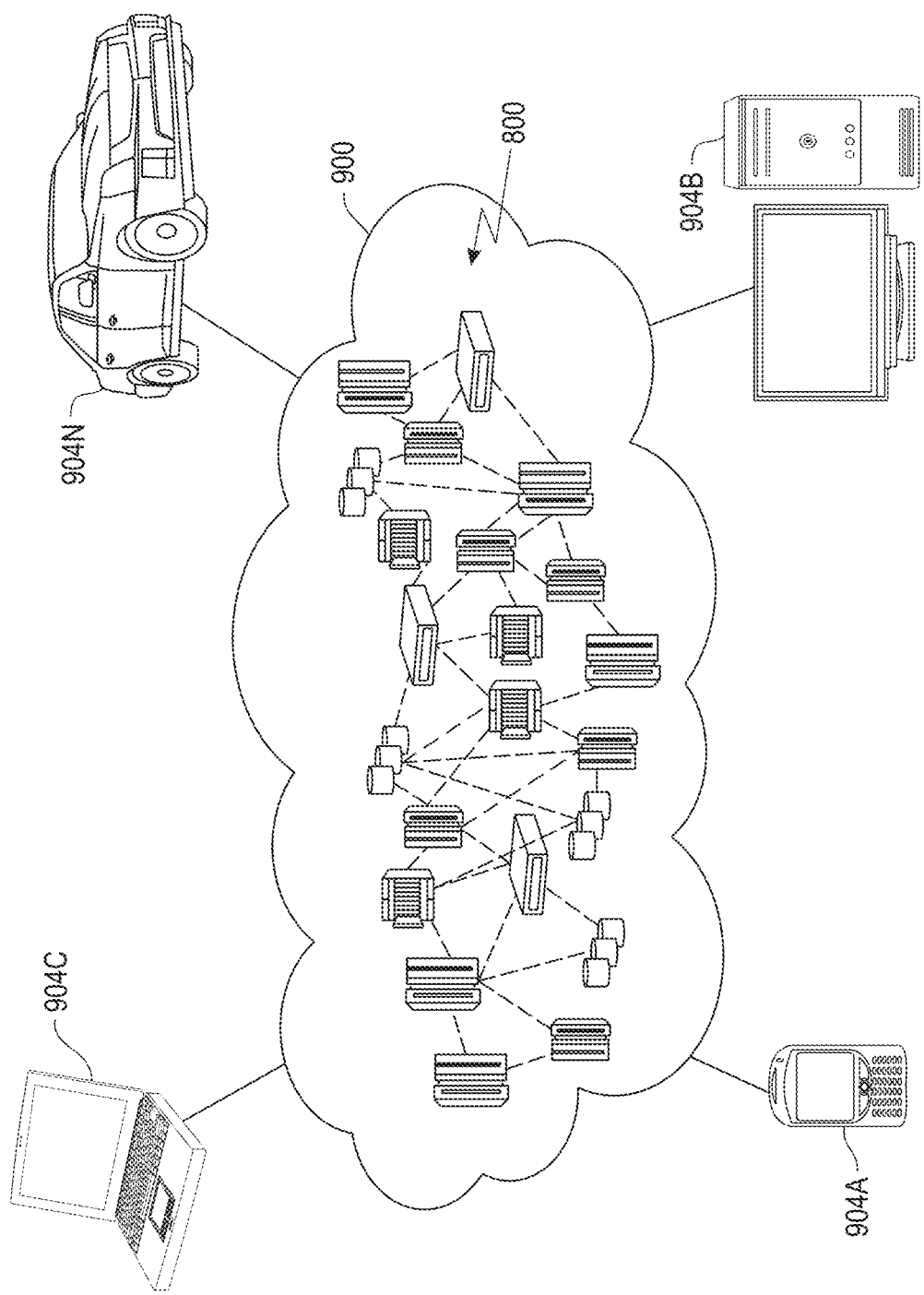
FIG. 9 depicts a cloud computing environment, in accordance with one embodiment.

Referring now to FIG. 9, illustrative cloud computing environment 900 is depicted. As shown, cloud computing environment 900 includes one or more cloud computing nodes 800 with which local computing devices used by cloud consumers, such as, for example, personal digital assistant (PDA) or cellular telephone 904A, desktop computer 904B, laptop computer 904C, and/or automobile computer system 904N may communicate. Nodes 800 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904A-N shown in FIG. 9 are intended to be illustrative only and that computing nodes 800 and cloud computing environment 900 can communicate with any type of computerized device over any type of network and/or network addressable connection (e.g., using a web browser).

Figure 10:
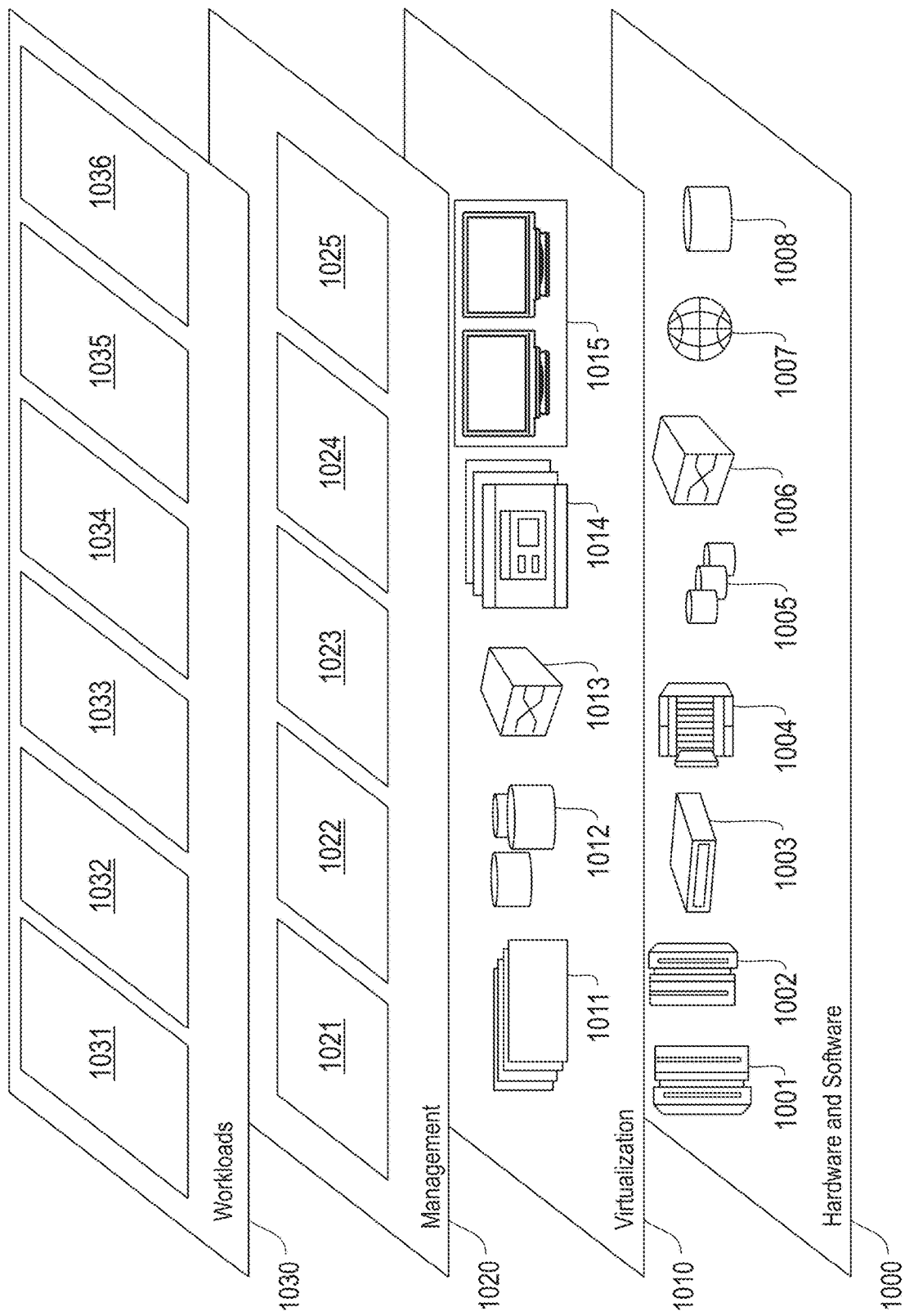
FIG. 10 depicts abstraction model layers, in accordance with one embodiment.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1000 includes hardware and software components. Examples of hardware components include: mainframes 1001; RISC (Reduced Instruction Set Computer) architecture based servers 1002; servers 1003; blade servers 1004; storage devices 1005; and networks and networking components 1006. In some embodiments, software components include network application server software 1007 and database software 1008.

Virtualization layer 1010 provides an abstraction layer from which the following examples of virtual entities may be provided: virtual servers 1011; virtual storage 1012; virtual networks 1013, including virtual private networks; virtual applications and operating systems 1014; and virtual clients 1015.

In one example, management layer 1020 may provide the functions described below. Resource provisioning 1021 provides dynamic procurement of computing resources and other resources that are utilized to perform tasks within the cloud computing environment. Metering and Pricing 1022 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1023 provides access to the cloud computing environment for consumers and system administrators. Service level management 1024 provides cloud computing resource allocation and management such that required service levels are met. Service Level Agreement (SLA) planning and fulfillment 1025 provide pre-arrangement for, and procurement of, cloud computing resources for which a future requirement is anticipated in accordance with an SLA.

Workloads layer 1030 provides examples of functionality for which the cloud computing environment may be utilized. Examples of workloads and functions which may be provided from this layer include: mapping and navigation 1031; software development and lifecycle management 1032; virtual classroom education delivery 1033; data analytics processing 1034; transaction processing 1035; as well as generating custom templates and/or making custom template related recommendations 1036.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating customized templates and template recommendations, comprising:
   extracting text content from user information which corresponds to a user;
   using the text content extracted from the user information to generate feature vectors;
   using the feature vectors to form one or more clusters of existing user editions;
   for each of the one or more formed clusters, generating a tree structure for each user edition in the cluster;
   combining the tree structures in the cluster into a merged tree structure;
   generating a customized template for each of the one or more formed clusters using the respective merged tree structure; and
   recommending at least one of the customized templates to the user based on the user information.

2. The computer-implemented method of claim 1, wherein using the feature vectors to form the one or more clusters of existing user editions includes:
   extracting text content from the existing user editions;
   using the text content extracted from the user editions along with the text content extracted from the user information to generate the feature vectors; and
   clustering two or more of the existing user editions based on the corresponding feature vectors.

3. The computer-implemented method of claim 1, wherein each tree structure includes a plurality of nodes organized in a number of levels, wherein combining the tree structures in the cluster into a merged tree structure includes:
   forming each level of the merged tree structure by:
      grouping nodes at the given level of the tree structures,
      evaluating the grouping of nodes based on the feature vectors which correspond thereto,
      removing nodes and their offspring identified as being trivial,
      merging nodes identified as being significant to form a merged node, and
      renaming the merged node.

4. The computer-implemented method of claim 3, wherein the levels of the merged tree structure are formed in a top-down order.

5. The computer-implemented method of claim 1, wherein recommending at least one of the customized templates to the user based on the user information includes:
   converting customized templates and user information into feature vectors;
   measuring a similarity based on the feature vectors;
   identifying a customized template which most closely matches the user information; and
   recommending the identified customized template.

6. The computer-implemented method of claim 1, wherein the user information is selected from the group consisting of: background information, expertise information, requirements, and preferences.

7. The computer-implemented method of claim 1, comprising:
   extracting text content from a user edition associated with the user; and
   using the text content extracted from the user edition along with the text content extracted from the user information to generate the feature vectors.

8. The computer-implemented method of claim 1, comprising:
   receiving an initial template,
   wherein the initial template is used along with the feature vectors to form the one or more clusters of existing user editions.

9. A computer program product comprising a computer readable storage medium having program instructions embodied therewith, the program instructions readable and/or executable by a processor to cause the processor to:
   extract, by the processor, text content from user information which corresponds to a user;
   use, by the processor, the text content extracted from the user information to generate feature vectors;
   use, by the processor, the feature vectors to form one or more clusters of existing user editions;

for each of the one or more formed clusters, generate, by the processor, a tree structure for each user edition in the cluster;

combine, by the processor, the tree structures in the cluster into a merged tree structure;

generate, by the processor, a customized template for each of the one or more formed clusters using the respective merged tree structure; and recommend, by the processor, at least one of the customized templates to the user based on the user information.

10. The computer program product of claim 9, wherein using the feature vectors to form the one or more clusters of existing user editions includes:

extracting text content from the existing user editions;

using the text content extracted from the user editions along with the text content extracted from the user information to generate the feature vectors; and clustering two or more of the existing user editions based on the corresponding feature vectors.

11. The computer program product of claim 9, wherein each tree structure includes a plurality of nodes organized in a number of levels, wherein combining the tree structures in the cluster into a merged tree structure includes:

forming each level of the merged tree structure by:
grouping nodes at the given level of the respective tree structures,
evaluating the grouping of nodes based on the feature vectors which correspond thereto,
removing nodes and their offspring identified as being trivial,
merging nodes identified as being significant to form a merged node, and
renaming the merged node.

12. The computer program product of claim 11, wherein the levels of the merged tree structure are formed in a top-down order.

13. The computer program product of claim 9, wherein recommending at least one of the customized templates to the user based on the user information includes:

converting customized templates and user information into feature vectors measuring a similarity based on the feature vectors;

identifying a customized template which most closely matches the user information; and recommending the identified customized template.

14. The computer program product of claim 9, wherein the user information is selected from the group consisting of: background information, expertise information, requirements, and preferences.

15. The computer program product of claim 9, the program instructions readable and/or executable by the processor to cause the processor to:

extract, by the processor, text content from a user edition associated with the user; and use, by the processor, the text content extracted from the user edition along with the text content extracted from the user information to generate the feature vectors.

16. The computer program product of claim 9, the program instructions readable and/or executable by the processor to cause the processor to:

receive, by the processor, an initial template, wherein the initial template is used along with the feature vectors to form the one or more clusters of existing user editions.

17. A system, comprising:

a processor; and logic integrated with the processor, executable by the processor, or integrated with and executable by the processor, the logic being configured to:

extract, by the processor, text content from user information which corresponds to a user;

use, by the processor, the text content extracted from the user information to generate feature vectors;

use, by the processor, the feature vectors to form one or more clusters of existing user editions;

for each of the one or more formed clusters, generate, by the processor, a tree structure for each user edition in the cluster;

combine, by the processor, the tree structures in the cluster into a merged tree structure;

generate, by the processor, a customized template for each of the one or more formed clusters using the merged tree structure; and recommend, by the processor, at least one of the customized templates to the user based on the user information.

18. The system of claim 17, wherein each tree structure includes a plurality of nodes organized in a number of levels, wherein combining the tree structures in the cluster into a merged tree structure includes:

forming each level of the merged tree structure by:
grouping nodes at the given level of the respective tree structures,
evaluating the grouping of nodes based on the feature vectors which correspond thereto,
removing nodes and their offspring identified as being trivial,
merging nodes identified as being significant to form a merged node, and
renaming the merged node.

19. The system of claim 17, the logic being configured to:

extract, by the processor, text content from a user edition associated with the user; and use, by the processor, the text content extracted from the user edition along with the text content extracted from the user information to generate the feature vectors.

20. The system of claim 17, the logic being configured to:

receive, by the processor, an initial template, wherein the initial template is used along with the feature vectors to form the one or more clusters of existing user editions.

* * * * *